US006977012B2

(12) United States Patent
Nobutoh et al.

(10) Patent No.: US 6,977,012 B2
(45) Date of Patent: Dec. 20, 2005

(54) PAINTING FACILITY MANAGEMENT SYSTEM

(75) Inventors: Kenichi Nobutoh, Hiratsuka (JP); Jun Suzuno, Hiratsuka (JP)

(73) Assignee: Kansai Paint Co., Ltd., Hyogo (JP)

( * ) Notice: Subject to any disclaimer, the term of this patent is extended or adjusted under 35 U.S.C. 154(b) by 0 days.

(21) Appl. No.: 10/344,495

(22) PCT Filed: Jun. 25, 2002

(86) PCT No.: PCT/JP02/06340

§ 371 (c)(1),
(2), (4) Date: Feb. 10, 2003

(87) PCT Pub. No.: WO03/004733

PCT Pub. Date: Jan. 16, 2003

(65) Prior Publication Data

US 2003/0177978 A1 Sep. 25, 2003

(30) Foreign Application Priority Data

Jul. 2, 2001 (JP) ....................................... 2001-200707

(51) Int. Cl.[7] ................................................ B05C 11/10

(52) U.S. Cl. ....................... 118/665; 118/667; 118/689; 118/692; 118/694; 118/620

(58) Field of Search ................................ 118/680, 667, 118/690, 691, 692, 694, 696, 698, 704, 688, 679, 712, 665, 695, 620; 427/8

(56) References Cited

U.S. PATENT DOCUMENTS 4,904,365 A * 2/1990 Kawamura et al. ......... 204/623
5,110,440 A * 5/1992 Case .......................... 427/232
5,167,714 A * 12/1992 Gimben et al. ............. 118/688
6,073,055 A 6/2000 Jahn et al.
6,132,511 A * 10/2000 Crum et al. ................ 118/706
2002/0062788 A1 * 5/2002 Czech et al. ................ 118/696

FOREIGN PATENT DOCUMENTS

| | | |
|---|---|---|
| CN | 1230731 | 1/2005 |
| JP | 64-66703 A | 3/1989 |
| JP | 2002-73159 A | 3/2002 |

* cited by examiner

*Primary Examiner*—J. A. Lorengo
*Assistant Examiner*—George Koch
(74) *Attorney, Agent, or Firm*—Knobbe Martens Olson & Bear LLP

(57) ABSTRACT

A coating equipment managing system for controlling and monitoring a coating equipment of an automobile manufacturing line, comprising local installations which are provided in the manufacturing lines at a plurality of localities, and a central installation for receiving data from the plurality of local installations, wherein the local installation comprises a sensor installed in the coating equipment, a data acquisition unit for receiving signals from the sensor, a control unit for controlling the coating equipment, and a local communication unit; the central installation comprises a server unit and a central analysis unit; the local communication unit transmits the data from the data acquisition unit to the server unit by E-mail; the server unit transmits correction data for the coating equipment obtained from the analysis of the measured data by the central analysis unit to the local communication unit by E-mail; and the local communication unit converts the correction data into a control code and transmit it to the control unit.

8 Claims, 6 Drawing Sheets

Fig. 4

| Data number | | 1 | 2 | 3 | 4 | 5 | 6 |
|---|---|---|---|---|---|---|---|
| Local site | | China A | China B | China B | Taiwan A | India A | India B |
| Coating line number | | 1 | 1 | 2 | 1 | 1 | 1 |
| Measurement date | | April 6 | April 8 | April 7 | April 4 | April 1 | April 3 |
| Coating Equipment | Emulsion supply (l/unit) | 240 | 250 | 100 | 80 | 150 | 180 |
| | Paste supply (l/unit) | 60 | 50 | 20 | 25 | 40 | 45 |
| | Throughput number (unit) | 35 | 40 | 38 | 39 | 48 | 45 |
| | Coating voltage (V) | 300 | 280 | 270 | 270 | 290 | 300 |
| | Current value (A) | 430 | 380 | 370 | 380 | 320 | 400 |
| | Electrification time (sec) | 210 | 180 | 220 | 230 | 210 | 220 |
| | Amount of UF permeation (l/min) | 25 | 23 | 27 | 35 | 38 | 50 |
| | Filter pressure difference ($kgf/m^2$) | 0.6 | 0.8 | 0.5 | 0.6 | 0.4 | 0.4 |
| | Drying furnace temperature | 190 | 200 | 180 | 180 | 175 | 190 |
| Paint property | Paint solid content (%) | 24 | 22 | 20 | 21 | 22 | 23 |
| | Ash content (%) | 21 | 19 | 20 | 21 | 21 | 22 |
| | Acid concentration | 27 | 26 | 27 | 28 | 26 | 25 |
| | pH | 6.2 | 6.0 | 6.1 | 6.0 | 6.1 | 6.3 |
| | Conductivity (μS/cm) | 1620 | 1580 | 1600 | 1710 | 1650 | 1610 |

Fig.5

| | | 1 | 2 | 3 | 4 | 5 | 6 |
|---|---|---|---|---|---|---|---|
| Data number | | 1 | 2 | 3 | 4 | 5 | 6 |
| Local site | | China A | | | | | |
| Coating line number | | 1 | | | | | |
| Measurement date | | April 6 | April 7 | April 13 | April 20 | April 27 | May 3 |
| Coating Equipment | Emulsion supply (l/unit) | 240 | 240 | 240 | 240 | 240 | 240 |
| | Paste supply (l/unit) | 60 | 58 | 58 | 58 | 58 | 58 |
| | Throughput number (unit) | 35 | 40 | 40 | 40 | 40 | 40 |
| | Coating voltage (V) | 300 | 300 | 300 | 300 | 300 | 300 |
| | Current value (A) | 430 | 430 | 430 | 430 | 430 | 410 |
| | Electrification time (sec) | 210 | 210 | 210 | 210 | 210 | 210 |
| | Amount of UF permeation (l/min) | 25 | 25 | 25 | 25 | 25 | 26 |
| | Filter pressure difference (kgf/m$^2$) | 0.6 | 0.6 | 0.6 | 0.6 | 0.6 | 0.5 |
| | Drying furnace temperature | 190 | 190 | 190 | 190 | 190 | 190 |
| Paint property | Paint solid content (%) | 24 | 22 | 22 | 22 | 23 | 22 |
| | Ash content (%) | 21 | 21 | 21 | 21 | 21 | 21 |
| | Acid concentration | 27 | 27 | 27 | 27 | 27 | 26 |
| | pH | 6.2 | 6.2 | 6.2 | 6.2 | 6.2 | 6.2 |
| | Conductivity ($\mu$S/cm) | 1620 | 1620 | 1620 | 1620 | 1620 | 1620 |

PAINTING FACILITY MANAGEMENT SYSTEM

TECHNICAL FIELD

The present invention relates to a coating equipment managing system for controlling and monitoring a coating equipment at a remote site by use of computers, and particularly relates to a coating equipment managing system for controlling and monitoring data of paints and coating conditions in many automobile manufacturing lines at home area and overseas through a communication system.

BACKGROUND ART

In recent years, automobiles and their parts are being produced in various places over the world such as China, Korea, Southeast Asia, India, Near East, North America, Canada, etc. The coating process in an automobile manufacturing line consists of under coating, middle coating, and top coating processes, and generally an electrodeposition coating is adopted as the under coating process.

In a coating equipment used in an electrodeposition coating process, a whole automobile body is immersed in an electrodeposition cistern containing electrodeposition paint and a voltage is applied to make the paint precipitate on the surface of the automobile body. And thereafter the body is washed and then baked in a drying furnace to form an electrodeposition layer. Since a large amount of paint is used in an electrodeposition coating process, an automatic coating and/or automatic paint feeding equipments are introduced. Furthermore, since there are many items to be managed, generally a control system for managing the coating equipment based on the measured data in the coating process is introduced.

FIG. 6 is a block diagram to show a configuration of typical electrodeposition coating equipment. The electrodeposition coating equipment includes an electrodeposition cistern (602) to accept the automobile body, a first reclaim washing cistern (604), a second reclaim washing cistern (605), an industrial water washing cistern (606), and a pure water washing cistern (607).

In the electrodeposition coating process, an automobile body (613) is carried by a carrier (612) in a suspended state to be immersed in the electrodeposition cistern (602) having a capacity of 10 to 300 tons and filled with electrodeposition paint. A coating layer is precipitated on the surface of the automobile body by applying a voltage of 250 to 300 V between the automobile body, which acts as an electrode, and an electrode plate (603) from a rectifier (601). Thereafter, the automobile body is washed in the first and second reclaim washing cisterns (604, 605), the industrial water washing cistern (606), and the pure water washing cistern (607). The cleaning fluid used in the washing processes at the first and second reclaim washing cisterns (604, 605) is a filtrate which is obtained by filtering the paint composition under pressure using an UF (Ultra Filtration) film. The filtrate is temporarily stored in a filtrate tank (611) and thereafter delivered to each washing cistern by a pump (not shown). The pigment components remained after the filtration are returned to a sub tank (610).

The paint which flows from the electrodeposition cistern (602) to the sub tank (610) serves to remove the foam generated at the surface of the paint in the electrodeposition cistern (602) since the sub tank (610) is provided with a liquid level difference, thereby preventing the foam from adhering to the automobile body (613). The paint collected from the first and second reclaim washing cisterns (604, 605), the precision filtration apparatus (608), and the UF module (609) is returned to the electrodeposition cistern (602) through the sub tank (610).

In the washing processes by use of the industrial water washing cistern (606) and the pure water washing cistern (607), industrial water and pure water are used as the cleaning liquid respectively. In the process (not shown) following these washing processes, the automobile body is dried by baking at a temperature of 150° C. to 200° C. for 10 to 90 minutes in a drying furnace to obtain an under coating layer.

Generally, the electrodeposition paint used in the electrodeposition coating process is a cationic electrodeposition paint in view of corrosion resistance, which consists of: an emulsion in which amino added epoxy resin as a base resin, a blocked isocyanate hardener, other additives, and acids of neutralizing agents are dispersed with water; and pigment paste in which coloring pigments, rust preventive pigments, and other pigments are dispersed with a dispersion resin.

In order to achieve a layer thickness, a finishing property (i.e. a uniformity of the coating surface), and a deposition property (i.e. a state of coating in narrow gaps) of the intended levels in an electrodeposition process, many check items regarding the electrodeposition paint are controlled in a timely fashion, which are such as pH, electric conductance, concentration of solid content, ash content, acid concentration, coat thickness of various parts of an automobile body, state of coating surface (i.e. generation of pinholes, etc.), deposition property, and others.

There are also many control items regarding the electrodeposition coating equipment, which are coating voltage of a rectifier (601); current value appearing during electrodeposition; liquid level, flow rate, and level difference from the sub tank (610) of the coating liquid in the electrodeposition cistern (602); current value in each electrode plate (603); concentration of solid content and pressure difference through filters in the first and second reclaim liquids; flushing pressure (water pressure at the nozzle) and state of the nozzles in the pure water washing process; pressure difference through filters and replacement frequency of the filters of the precision filtration apparatus (608); amount of permeation through the UF module (609) and replacement frequency of the module; and others.

As described above, to maintain a good finishing condition of the coating in an automated coating process, it is necessary to adjust the coating conditions (the voltage, cistern temperature, electrification time, etc. in the electrodeposition coating) adapting for the state of the paint. Furthermore, it is necessary to do sampling of the paint being used 1 to 3 times a week to determine the paint properties such as pH, electrical conductivity, acid concentration, coat thickness, etc. by analysis tests and thereby to perform, based on the estimation by the engineer, the determination of the amount and timing for adding the neutralizing agent, water, organic solvents, etc.; the control of coating conditions; the adjustment by supplementary paint; and the like.

For making these adjustments, expert engineers' knowledge is essential. There may be cases where no such expert engineer stays constantly at the coating line of a factory at a remote site in the home area and at overseas. In such cases, the coating line is managed in the following way.

The paint in use is sampled at a remote factory and is transported to a managing department by use of road, railway, air, or sea transportation so that the received paint is analyzed at the managing department. The data on the coating conditions regarding the coating equipment and the paint properties are recorded in a check sheet by the operator on the site and the check sheet is sent to the engineer of the managing department by facsimile. The engineer at the managing department scrutinizes the analysis results and the data on the coating conditions sent from the remote site and discuss the results with the on-the-site operators by way of telephone or the like to give instructions about the coating equipment.

As described above, in the coating line management based on instructions from the line control department to an on-the-site factory, problems exist in that it takes time to transport the sampled paint and, in addition to that, since the pigments tend to settle by being separated from the solvent during the transportation, it would take more time to return the paint into the original condition for analysis at the managing department. There is also another problem in that when the sampled paint was not sufficiently returned to its original state, the variation of test samples taken from the sampled paint would cause an increase in the measurement error in the analysis.

From these reasons, there were cases where the adjustment of the coating conditions was delayed or the instruction on the amount of the additives to be introduced in the paint was inaccurate.

As the measure for these problems, one possible way may be the placement of an engineer at each on-the-site factory, but it is costly to have engineers stationed at remote sites, especially at sparsely dispersed overseas sites, which has been a factor to hinder the deployment of providing paints to remote sites, especially to overseas automobile production sites.

SUMMARY OF THE INVENTION

To solve above described problems, the present invention is addressed to provide a coating equipment managing system based on computer control which can timely grasp the states of the paint and the coating equipment without limiting to electrodeposition coating of automobile manufacturing plant at remote sites, particularly sparsely dispersed overseas sites.

The present invention in one aspect provides a coating equipment managing system for controlling and monitoring an electrodeposition coating equipment of a production line, comprising a plurality of local installations which are provided in the manufacturing lines at a plurality of sites, and a central installation for receiving data from the plurality of local installations, wherein: the local installation comprises a cistern configured to contain coating composition and receive a coating target, an electrodeposition coating equipment configured to use for an electrodeposition coating in which a coating target is immersed into the cistern, a sensor installed in the electrodeposition coating equipment, a data acquisition unit for receiving signals from the sensor, a control unit for controlling the electrodeposition coating equipment, and a local communication unit; the central installation comprises a server unit and a central analysis unit; the local communication unit transmits the data containing the measured data received from the data acquisition unit to the server unit through a communication network; the server unit transmits the measured data received from the local communication unit to the central analysis unit and transmits correction data for the electrodeposition coating equipment to be obtained from the analysis of the measured data by the central analysis unit to the local communication unit through the communication network; and the local communication unit converts the correction data received from the server unit into a control code and transmits it to the control unit.

The data which the local communication unit transmits out through the communication network may include measured data received from the data acquisition unit, measurement items, and measurement dates, and information to identify the coating equipment.

The correction data which the server unit receives via the communication network may include a correction item corresponding to a measurement item of the sensor, and a preset value of the item, both of which are defined for the case where the measured data received from the local communication unit are out of a predetermined range.

The present invention in another aspect provides a coating equipment managing installation for controlling and monitoring the electrodeposition coating equipment of a production line, comprising a central installation for receiving data from local installations installed in manufacturing line at a plurality of localities, the central installation comprising a server unit which receives the measured data based on output signals of a sensor installed in the electrodeposition coating equipment of a local installation through a communication network, and a central analysis unit, and the server unit configured to transmit the measured data received from a local communication unit to the central analysis unit and transmit correction data for the electrodeposition coating equipment obtained from the analysis of the measured data by the central analysis unit to the local communication unit through the communication network, wherein each of the local installations comprises a cistern configured to contain coating composition and receive a coating target, and an electrodeposition coating equipment configured to use for an electrodeposition coating in which a coating target is immersed into the cistern.

The present invention in still another aspect provides a local installation for coating equipment management for controlling and monitoring an electrodeposition coating equipment in a automobile manufacturing line, the local installation being provided in the manufacturing line having the electrodeposition coating equipment at a plurality of localities, and adapted to exchange data with a central installation which receives data from the plurality of local installations, analyzes the data and transmits correction data for the electrodeposition coating equipment to the local installation through a communication network, wherein the local installation comprises a sensor installed in the electrodeposition coating equipment, a data acquisition unit for receiving signals from the sensor, a control unit for controlling the electrodeposition coating equipment, and a local communication unit, and the local communication unit is configured to transmit data containing measured data received from the data acquisition unit to the central installation through a communication network and converts the correction data received from the central installation into a control code and transmit it to the control unit, wherein the local installation comprises a cistern configured to contain coating composition and receive a coating target; and an electrodeposition coating equipment configured to use for an electrodeposition coating in which a coating target is immersed into the cistern.

In the coating equipment managing system, coating equipment managing installation, or local installation for coating equipment management, the correction data may comprise a correction item corresponding to a measurement item of the sensor, and a preset value of the item, wherein the measurement item relates to a paint property and/or coating process, the measurement items relating to the paint property including at least one kind selected from the group consisting of pH value, electrical conductivity, concentration of solid content, concentration of ash content, acid concentration, and cistern temperature regarding the paint, and the measurement items relating to the coating process item including at least one kind selected from the group consisting of coating voltage of the rectifier, current value during coating, current value of the electrode plate, electrification time, level of the coating liquid in an electrodeposition cistern, flow rate, level difference from a sub tank, concentration of solid content in a reclaim liquid process, pressure difference through a filter, flushing pressure and state of the nozzles in the washing process, amount of permeation of a UF module, frequency of reverse flushing, amount of emulsion supply, amount of paste supply, throughput number of the coating equipment, and temperature of the drying furnace.

BRIEF DESCRIPTION OF THE DRAWINGS

FIG. 4 is a table to show the measured data of the multiple local installations recorded on the database;

FIG. 5 is a table to show time-series data of a particular local installation recorded on the database.

DETAILED DESCRIPTION OF THE INVENTION

Hereinafter, embodiments of the coating equipment managing system according to the present invention will be described referring to the appended drawings.

Figure 1:
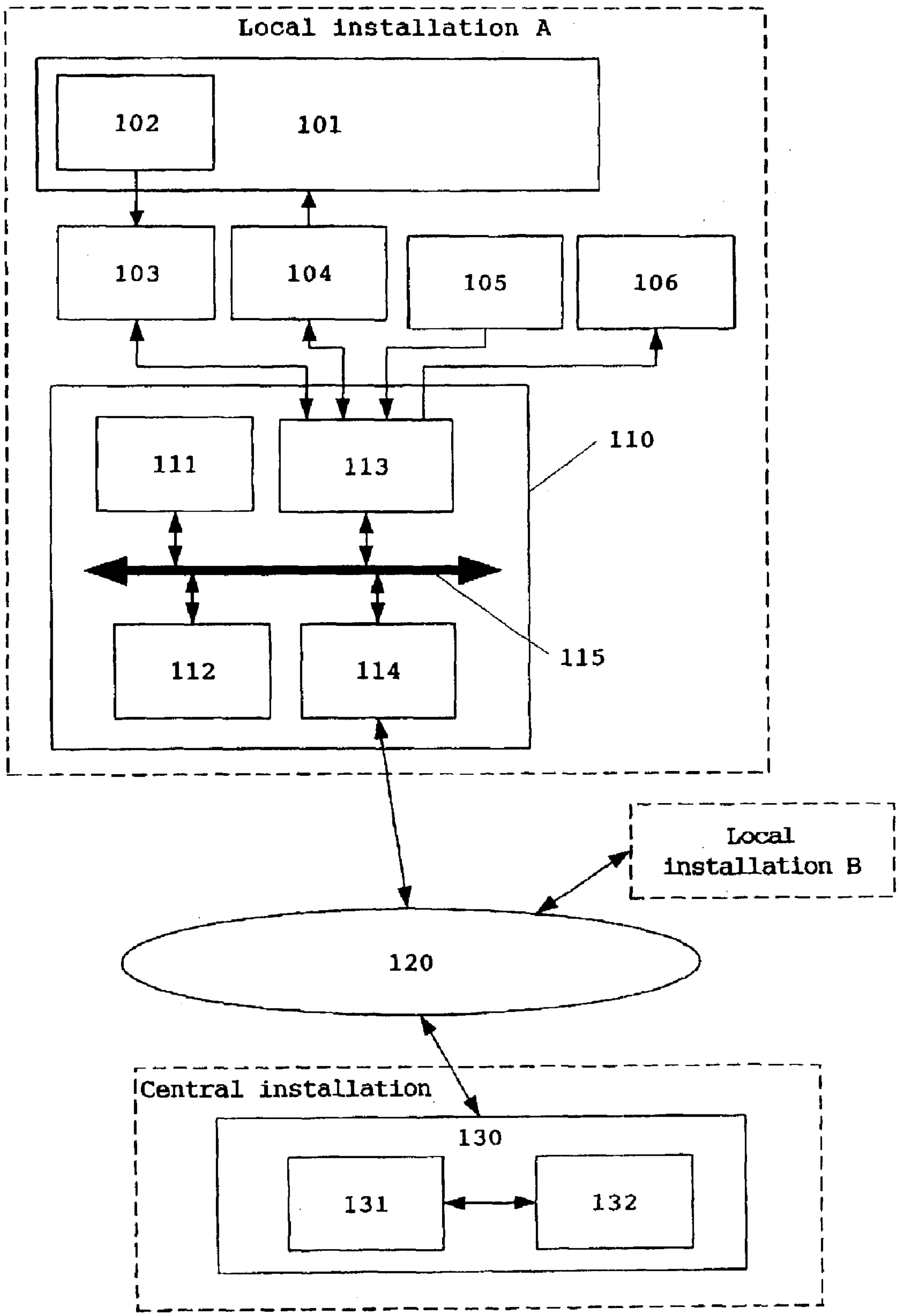
FIG. 1 is a block diagram to show the arrangement of the coating equipment managing system according to the present invention.

FIG. 1 is a block diagram to show the arrangement of the coating equipment managing system according to the present invention. As seen in the figure, the coating equipment managing system according to the present invention comprises local installations which are provided in the automobile manufacturing lines at a plurality of localities, and a central installation which receives data from the above described plurality of local installations.

The above described local installation comprises a sensor or sensors(102) installed in an electrodeposition coating equipment (101), a data acquisition unit (103), a control unit (104), an input unit (105), a display unit (106), and a local communication unit (110). And the above described central installation comprises a server unit (130).

The data acquisition unit (103) receives signals from the sensor (102) installed in the coating equipment (101), and converts them into digital data to temporarily record them on a built-in recording module (not shown), and thereafter transmits them to a local communication unit (110) at a predetermined timing.

The local communication unit (110) comprises a processing module (111), a recording module (112), an unit interface module (113), a communication module (114), and a data bus (115), and receives inputs of necessary data and instructions from the input unit (105), and measured data from the data acquisition unit (104), and perform data conversion of the received data to transmit them to the server unit (130). The data exchange within the local communication unit (110) is conducted through the data bus (115). The operating condition of the local communication unit (110), the data inputted into the local communication unit (110) by the line operator of the local installation A, the measured data received from the data acquisition unit (103), and the like are displayed on a display unit (106).

As the local communication unit (110), the server unit (130) of the above described local installation comprises a processing module (131), a recording module, a communication module (not shown), and a database (132). The server unit (130) is installed in a managing department which is remote from local installation A of the automobile manufacturing line in which the coating facility (101) and the local communication unit (110) are installed. In FIG. 1, the local installation B is also provided with a coating equipment, a local communication unit, and others as is the local installation A, and the server unit (130) transmits/receives data to/from a plurality of local installations through a communication system (120). The communication system (120) consists of a public communication system or a dedicated communication system.

Figure 2:
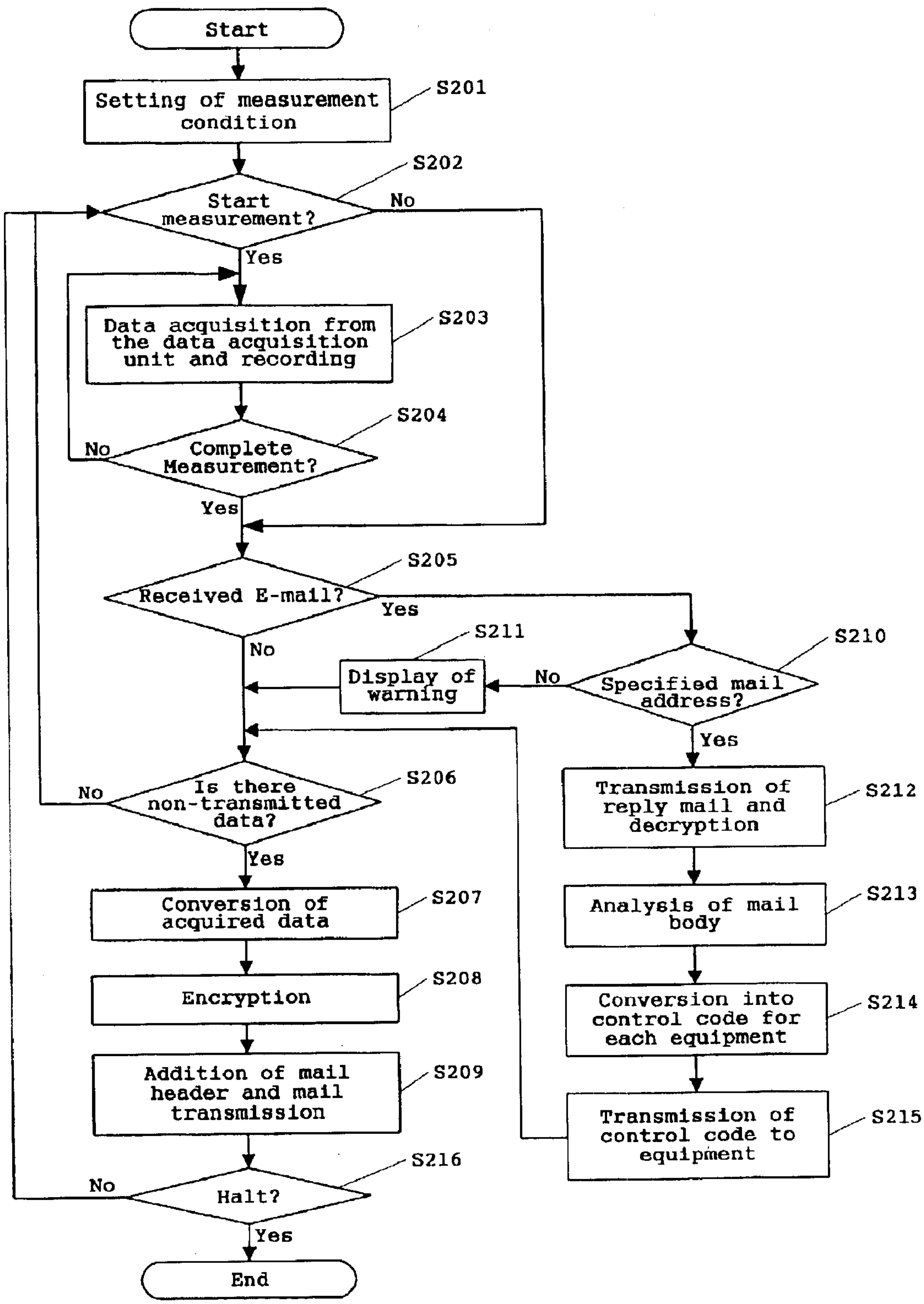
FIG. 2 is a flow chart to show the processing regarding the local communication unit.

FIG. 2 is a flow chart to show the processing regarding the local communication unit (110). Hereinafter, the processing performed in the processing module (111) of the local communication unit (110) will be described referring to FIGS. 1 and 2.

First, in step 201, the measurement conditions (measurement date, number of measurements, etc.) of the data acquisition unit (103) inputted from the input unit (105) are recorded in the recording module (112) and necessary measurement conditions are transmitted to the data measurement unit (104).

In step 202, the processing module (111) monitors the time with a built-in timer (not shown) and determines whether it is a predetermined time for starting the measurement or not. When it is determined that it is the time for starting the measurement, the processing moves onto step 203. When it is determined that it is not the time for starting the measurement yet, the processing moves onto step 205 and the presence or absence of received E-mails is confirmed.

In step 203, an instruction for starting the measurement is given to the data acquisition unit (103). Upon receiving this instruction, the data acquisition unit (103) conducts the measurements by use of the sensors installed in the electrodeposition coating equipment, and transmits the digitally converted measured data to the local communication unit (110). The measured data include the data relating to the electrodeposition paint such as pH, conductivity, concentration of the solid content, cistern temperature, ash content, acid content, etc. The measured data include the data relating to the electrodeposition coating equipment such as coating voltage of the rectifier, amount of current flow during coating, level and flow rate of the paint liquid in the electrodeposition cistern, level difference from the sub-tank, amount of current flow through the electrodes relating to the electrodes, concentration of the solid content and pressure difference through the filter relating to the first and second reclaim washing processes, flushing pressure and state of the nozzles relating to the pure water washing process, and permeation of the UF module, frequency of reverse (acid) washing and the pressure difference relating to the precision filtering process. The local communication unit (110) records the received data on the recording module (112) in correspondence with the receiving date of the measured data.

In step 204, determination is made on whether the measurement has been completed or not, and the processing goes back to step 203 if it is determined that the measurement has not been completed, and moves to step 205 if it is determined that the measurement has been completed.

In step 205, an E-mail server (not shown), which is connected to the communication system, is accessed through the communication module (115) to confirm the presence or absence of a new E-mail from the server unit (130) which is to be described later. If it is determined that no new mail is present, the processing moves to step 206.

If it is determined that a new mail is present, the processing moves to step 210 to determine whether the transmiter's E-mail address included in the mail header of the received mail is the E-mail address which has been set in advance as the E-mail address of the server unit (130).

If it is determined that it is not the mail address of the server unit (130), the processing moves to step 211 to display a warning on the display unit (106) and thereafter moves to step 206. If it is determined that it is the mail address of the server unit (130), the processing moves to step 212.

In step 212, if the received mail is encrypted, decoding process is conducted to convert it into decrypted text.

In step 213, the body of the decoded mail is interpreted and the data for controlling the equipment are extracted. As described later, the mail from the server unit (130) keeps the records of the numerical values in correspondence with the control items for controlling the coating equipment. As the method of interpretation, for example, a method of searching for a pre-assigned control item in the body of the mail, which is in text form, and getting the associated numerical value may be adopted.

In step 214, a control code for each control unit (104) subject to control are generated using the control items and corresponding numerical values obtained in step 213, and transmitted. Thereafter, the processing moves to step 206. Through step 214, the process condition of the electrodeposition coating equipment is altered by the control unit (104) and thus the electrodeposition coating process is maintained in a normal state.

In step 206, it is determined whether the data to be transmitted remain in the recording module (112). If it is determined that there remains no transmission data, the processing returns to step 202. If it is determined that there remains transmission data, the measured data are read out from the recording module (112) to make them ready for transmission.

In step 207, the measurement date, measurement items, and measured data are converted into text data, and the information to identify the local installation and the coating line, and the like are added thereto.

In step 208, the text data obtained in step 207 are encrypted.

In step 209, to transmit the encrypted data file to the server unit (130), a mail header which describes the destination E-mail address and the transmiter's E-mail address are added to the data file, and the E-mail server is accessed to transmit it using the SMTP protocol.

Finally in step 216, it is determined whether a halt instruction has been given or not. If it is determined that no halt instruction has been given, the processing returns to step 202, and if it is determined that a halt instruction has been given, the processing is halted for termination.

As described so far, the processing module (111) repeats the cycle of steps 202, 205, and 206 until the measurement is started, and when it receives an E-mail from the server unit (130), the processing module (111) performs the processing in each step of 205, 210 to 215, and 206. And when it is the time for starting the measurement, the steps 203 and 204 are repeated, and to give a priority on the transmission of the control code to the control unit (104), the presence or absence of E-mails from the server unit (130) is confirmed in step 205 without moving promptly to step 206 after the measurement, and if there is no E-mail received, the processing is preformed starting from step 206.

In the above description, though the case of automatically measuring the necessary items by means of a data acquisition unit is described, it is also possible that the operator inputs the measured data from the input unit (105). It is also possible to arrange such that part of the data are acquired automatically, and the rest of the data are inputted from the input unit (105) and the operator inputs an instruction of transmission via the input unit (105) so that the processing of data conversion and E-mail transmission starting from step 207 is performed. For example, regarding the measured data shown in FIGS. 4 and 5, it may be arranged such that the data concerning the coating process such as amounts of emulsion supply and paste supply, number of equipment, coating voltage and current are automatically measured by the sensors (102) and the data acquisition unit (103) installed in the coating facility (101), and the paint property data such as solid content, ash content, acid concentration, pH, conductivity of the paint are measured and inputted via the input unit (105) by the operator or the staff stationed on the site, thereafter the measured data being transmitted to the production line management department through an instruction of mail transmission.

Figure 3:
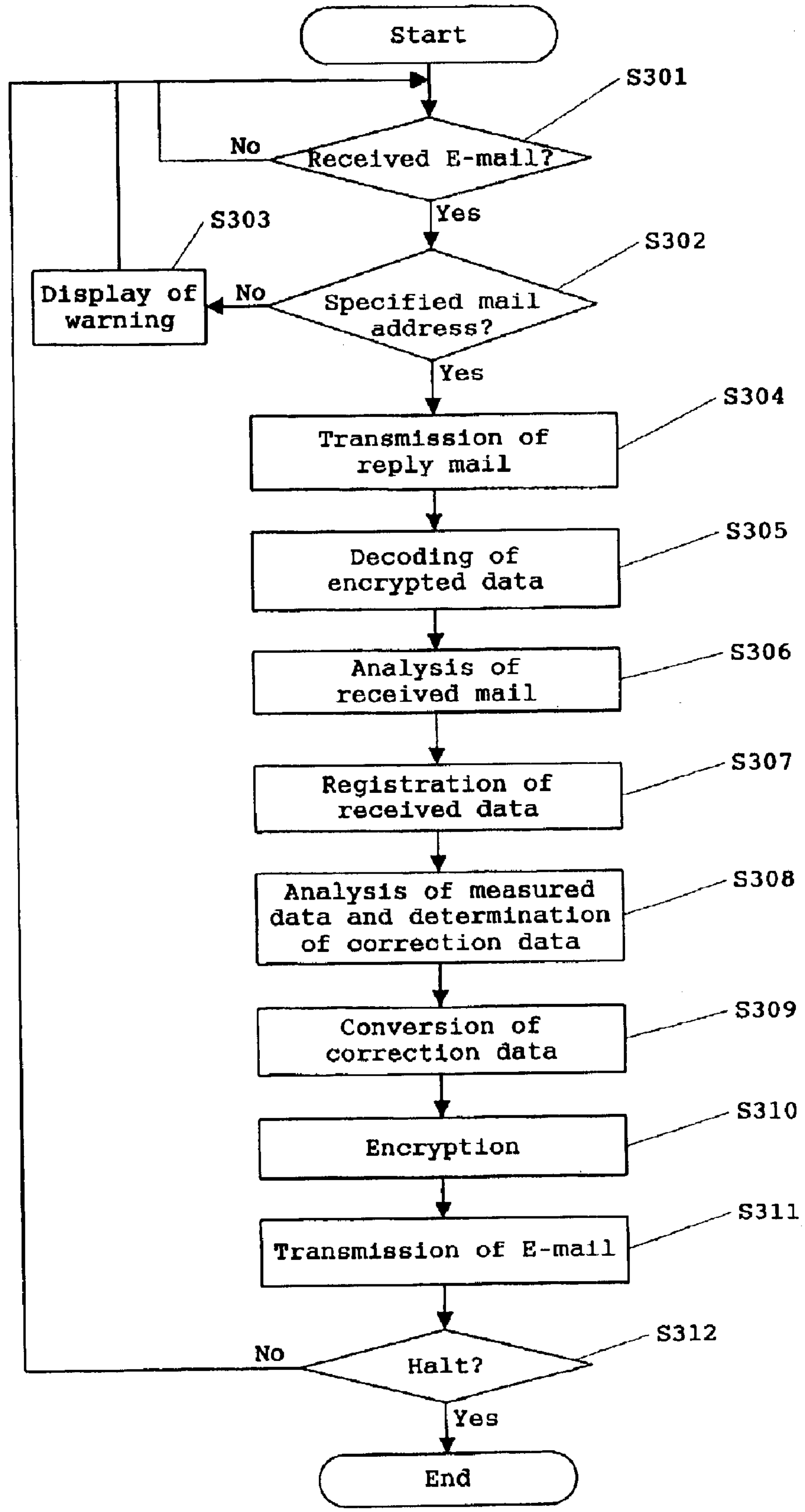
FIG. 3 is a flow chart to show the processing regarding the server unit.
Figure 6:
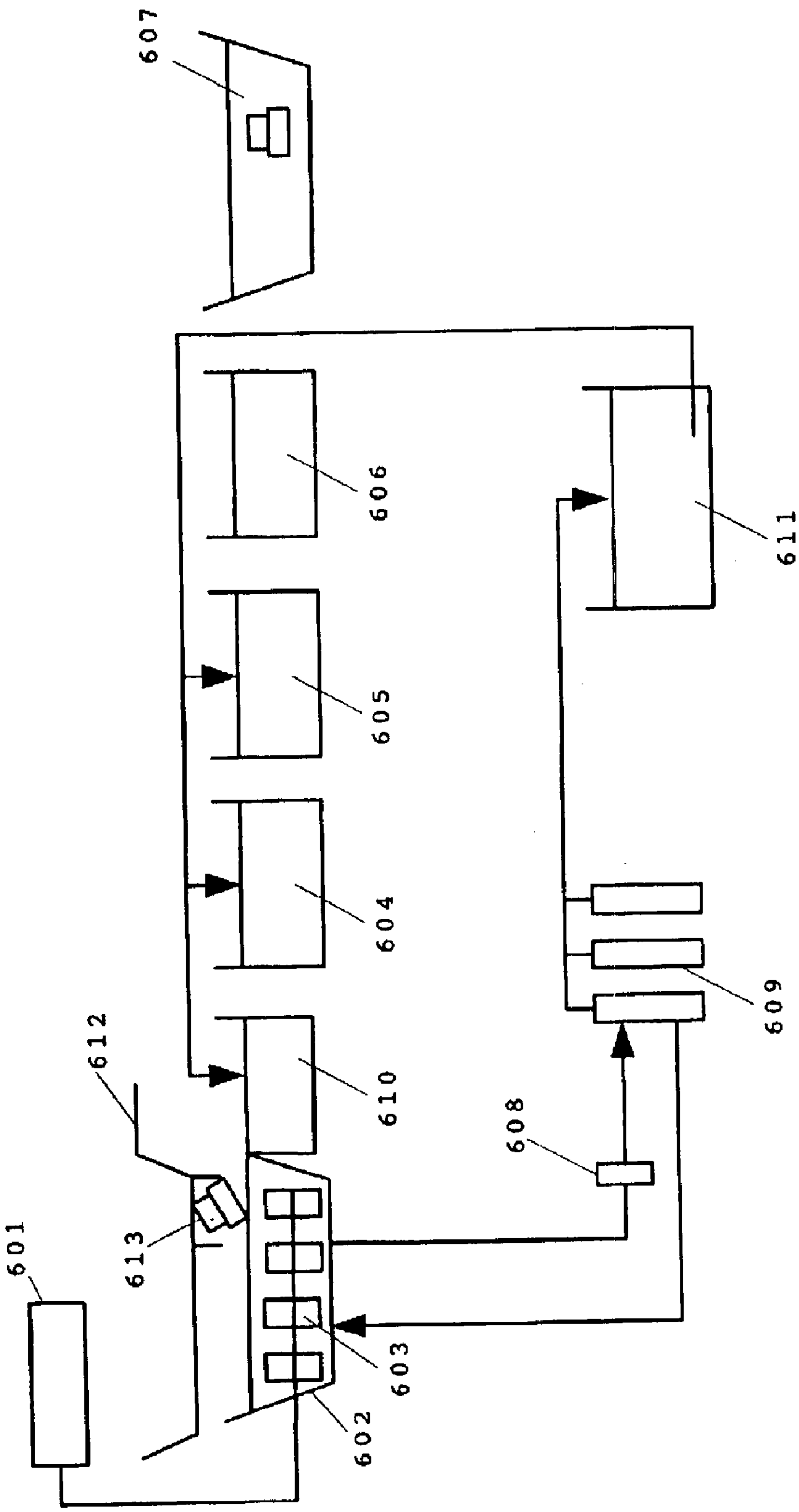
FIG. 6 is a block diagram to show the arrangement of the electrodeposition coating equipment.

FIG. 3 is a flow chart to show the processing regarding the server unit (130). Hereinafter, the processing by the processing module (131) of the server unit (130) will be described with reference to FIGS. 1 and 3.

First, in step 301, the E-mail server is accessed at a predetermined timing to determine whether or not any E-mail has arrived from the local communication unit (110). If it is determined that there is a received mail, the processing moves to step 302, and if it is determined that there is no received mail, the confirmation of received mail is repeated by waiting for the next timing.

In step 302, the transmiter's E-mail address is acquired from the E-mail header of the received mail from the E-mail server to determine whether there is a match with any of the mail addresses of the local installations which are registered in advance on the database. If it is determined that there is no match, a warning is displayed (step 303) on the display unit and the processing returns to step 301. If it is determined that there is a match, the processing moves to step 304.

In step 304, a reply mail is transmitted to the transmiter's E-mail address obtained in step 302 to notify the reception of the mail.

In step 305, if the received mail is encrypted, decoding is performed to convert it into decrypted text.

In step 306, the received data are interpreted to extract the measurement items, measured data, and measurement dates. As the method of interpretation, as described in the step 213 regarding the local communication unit (110), the method of searching the body of the mail, which is text form, to obtain corresponding numerical values by using the control items may be used.

In step 307, the measurement items, measured data, and measurement date extracted in step 306 are registered on the database (132). Data such as the mail addresses of the local installations, coating lines, measurement items, etc. are registered in advance and, for the data such as measured data and measurement date, the data received through E-mail are registered. An example of data registered on the database are shown in FIGS. 4 and 5. FIG. 4 shows measured data at multiple local installations recorded on the database and, in the figure, the data of the data numbers 2 and 3 represent measured data for different coating lines at the same site, china A. FIG. 5 shows measured data in time sequence for a particular local installation.

In step 308, the measured data of the local installation corresponding to the mail address identified in step 302 are obtained from the database, and the variation of each item is analyzed so that correction data can be determined when it is determined that a deviation from the normal state has occurred or may possibly occur. For example, determination is made on whether or not the latest data for each item is out of the predetermined normal range, or whether or not there is possibility that the data of each item deviates from the normal range in the near future, through the analysis of the variation trend of each item within a predetermined period. As the result of the determinements, when it is determine realized that a particular measurement item is out of or would possibly go out of its normal range, the correction item and preset value corresponding to the particular measurement item are determined as the correction data.

The determination of the correction data may be performed automatically by using the database which records in advance the extent of the deviation in correspondence with the correction data. It is also possible that an engineer determines the correction data or checks the results of the automatic processing using the database.

In step 309, the correction data (correction items and preset values) determined in step 308 are converted into text data with adding information identifying the local installation and the coating line etc.

In step 310, the text data converted in step 309 is subjected to encryption processing.

In step 311, the data encrypted in step 309 is added with the mail header which contains the transmiter's E-mail address identified in step 302 to be transmitted as an Email using the SMTP protocol.

Finally, in step 312, the presence or absence of a halt instruction is determined, and if it is determined that a halt instruction has been given, the processing is terminated, and if it is determined that no halt instruction has been given, the processing returns to step 301.

The above description will be supplemented by referring to FIG. 5 which shows an example of the measured data recorded on the database. The data in the columns of data number 1 and 2 of FIG. 5 represent the results of controlling the coating equipment at China A site by the managing system of the present invention as follows.

Assuming that the upper limit of the concentration of the solid content of the paint had been defined as 23%, the concentration of the solid content of the paint in the column of the data number 1 measured on April 6 exceeded the upper limit. Consequently, the server unit needed to determine the correction data to be transmitted to the local communication unit to make the measured data go back to the normal range.

In the coating equipment, when the solid content in the electrodeposition cistern increases, the coating thickness increases thereby causing negative effects such as secondary drips and decrease of reclaim rate. Conversely, when the solid content decreases, that would cause the coating thickness, finish property, and deposition property to degrade. Therefore, the solid content concentration of the paint is one of the most important items which need to be regulated within a specific range. The paint is supplied depending on the throughput number of the automobiles which pass through the equipment. The solid content in the cistern may be regulated by changing the supplying amount of the paint or by changing the throughput number of the automobiles. Therefore, by recording the throughput number of automobiles on the database as one of the correction items for the case where the solid content concentration of the paint deviates from the predetermined range, and by recording the numeric values of the throughput number of automobiles in correspondence with the extent of the deviation of the solid content concentration of the paint, the server unit can determine the correction data by searching the database. In the present example, the throughput number of automobiles was determined as one of the correction items, and "40" as its numerical value. These were transmitted to the local communication unit installed at the remote site A.

Upon receiving the correction data, the local communication unit at the remote site A converted the correction data into a control code for the equipment to be controlled and transmitted it to the equipment. It can be seen that, as the result, the coating condition of the paint equipment was altered, the throughput number of automobiles was changed to the predetermined numerical value (40 units) in the data measured at the succeeding measurement on April 7 shown as data number 2, and the solid content of the paint returned to 22% which is within a normal range.

In the above description, where the data exchange between the local communication unit (110) and the server unit (130) is conducted by way of the body of E-mail in text data format, but the data exchange may also be conducted by appending to the E-mail a data file containing the information to be exchanged. In the latter case, the data can be exchanged in a binary data file without being converted into a text data file. It is also possible to conduct the data exchange through a public or dedicated communication system without limiting to E-mail.

According to the coating equipment managing system of the present invention, it is possible to collectively and automatically monitor and control the coating equipments of local installations dispersed in the home area or overseas.

Further, the engineer at the management site can grasp the state of the coating process and the coating conditions at a local installation in timely fashion without transporting the paint samples from the local installation to the management department, and thus the engineer can effectively give necessary instructions for controlling the coating equipment to the operator or staff stationed at the site.

Furthermore, it is possible to reduce the number of the staff stationed at the local installations and the need for the engineer to visit or station at the local sites, and thus offering a cost reduction.

INDUSTRIAL APPLICABILITY

The present invention provides a coating equipment managing system for controlling and monitoring the coating equipments located at remote sites using a computer system. In particular, the invention provides a coating equipment managing system which can control and monitor the data on the paints and the coating conditions at many automobile manufacturing lines including at least one of an assembly line or a parts production line in the home area and at overseas through a communication system, thus enabling effective management of the coating process and cost reduction thereof.

What is claimed is:

1. A coating equipment managing system for controlling and monitoring an electrodeposition coating equipment of an automobile manufacturing line, comprising:

a local installation which is provided in a manufacturing line at each of a plurality of localities; and a central installation for receiving data from a plurality of the local installations, characterized in that:

said local installation comprises:

a cistern configured to contain coating composition and receive a coating target;

an electrodeposition coating equipment configured to use for an electrodeposition coating in which a coating target is immersed into the cistern;

a sensor installed in said electrodeposition coating equipments;

a data acquisition unit for receiving signals from said sensor;

a control unit for controlling said electrodeposition coating equipment; and a local communication unit;

said central installation comprises:

a server unit and a central analysis unit;

said local communication unit transmits data containing measured data received from said data acquisition unit to said server unit through a communication network; said server unit transmits the measured data received from said local communication unit to said central analysis unit and transmits correction data for said electrodeposition coating equipment obtained from the analysis of said measured data by said central analysis unit to said local communication unit through the communication network; and said local communication unit converts said correction data received from said server unit into a control code and transmits it to said control unit.

2. A coating equipment managing system according to claim 1, characterized in that the data which said local communication unit transmits out through the communication network include measured data received from said data acquisition unit, measurement items, measurement dates, and information to identify the coating equipment.

3. A coating equipment managing system according to claim 1, characterized in that the correction data which said server unit transmits through the communication network includes a correction item corresponding to a measurement item of the sensor, and a preset value of the item, both of which are defined for the case where the measured data received from said local communication unit is out of a predetermined range.

4. A coating equipment managing system according to claim 1, characterized in that:

said correction data comprises a correction item corresponding to a measurement item of the sensor, and a preset value of the item;

said measurement item relates to a paint property and/or coating process;

the measurement items relating to said paint property include at least one kind selected from the group consisting of pH value, electrical conductivity, concentration of solid content, concentration of ash content, acid concentration, and cistern temperature regarding the paint; and the measurement items relating to said coating process include at least one kind selected from the group consisting of coating voltage of a rectifier, current value during coating, current value at an electrode plate, electrification time, level of the coating liquid in an electrodeposition cistern, flow rate, level difference from a sub tank, concentration of solid content in a reclaim liquid process, pressure difference through a filter, flushing pressure and state of a nozzle in a washing process, amount of permeation of a UF module, frequency of reverse flushing, amount of emulsion supply, amount of paste supply, throughput number of the coating equipment, and temperature of a drying furnace.

5. A coating equipment managing installation for controlling and monitoring an electrodeposition coating equipment in a production line, comprising:

a central installation for receiving data from local installations installed in production lines at a plurality of localities, characterized in that:

said central installation comprises a server unit which receives measured data based on output signals of a sensor installed in said electrodeposition coating equipment through a communication network, and a central analysis unit; and said server unit is configured to transmit the measured data received from a local communication unit of the local installation to said central analysis unit and to transmit correction data for said electrodeposition coating equipment, obtained from the analysis of said measured data by said central analysis unit, to said local communication unit through the communication network, wherein each of the local installations comprises:

a cistern configured to contain coating composition and receive a coating target; and an electrodeposition coating equipment configured to use for an electrodeposition coating in which a coating target is immersed into the cistern.

6. A coating equipment managing installation according to claim 5, characterized in that:

said correction data comprises a correction item corresponding to a measurement item of the sensor, and a preset value of the item;

said measurement item relates to a paint property and/or coating process;

the measurement items relating to said paint property include at least one kind selected from the group consisting of pH value, electrical conductivity, concentration of solid content, concentration of ash content, acid concentration, and cistern temperature regarding the paint; and the measurement items relating to said coating process include at least one kind selected from the group consisting of coating voltage of a rectifier, current value during coating, current value at an electrode plate, electrification time, level of the coating liquid in an electrodeposition cistern, flow rate, level difference from a sub tank, concentration of solid content in a reclaim liquid process, pressure difference through a filter, flushing pressure and state of a nozzle in a washing process, amount of permeation of a UF module, frequency of reverse flushing, amount of emulsion supply, amount of paste supply, throughput number of the coating equipment, and a temperature of a drying furnace.

7. A local installation for coating equipment management for controlling and monitoring an electrodeposition coating equipment in an automobile manufacturing line, said local installation being provided in the manufacturing line having said electrodeposition coating equipment at each of a plurality of localities, and adapted to exchange data with a central installation which receives data from said plurality of local installations, analyzes the data and transmits correction data for said electrodeposition coating equipment to said local installation through a communication network, characterized in that:

said local installation comprises:

a sensor installed in said electrodeposition coating equipment, a data acquisition unit for receiving signals from said sensor, a control unit for controlling said electrodeposition coating equipment, and a local communication unit; and said local communication unit is configured to transmit data containing measured data received from said data acquisition unit to the central installation through a communication network and convert the correction data received from the central installation into a control code and transmit it to said control unit, wherein the local installation comprises:

a cistern configured to contain coating composition and receive a coating target; and an electrodeposition coating equipment configured to use for an electrodeposition coating in which a coating target is immersed into the cistern.

8. A local installation for coating equipment management according to claim 7, characterized in that:

said correction data comprises a correction item corresponding to a measurement item of the sensor, and a preset value of the item;

said measurement item relates to a paint property and/or coating process;

the measurement items relating to said paint property include at least one kind selected from the group consisting of pH value, electrical conductivity, concentration of solid content, concentration of ash content, acid concentration, and a cistern temperature regarding the paint; and the measurement items relating to said coating process include at least one kind selected from the group consisting of coating voltage of a rectifier, current value during coating, current value at an electrode plate, electrification time, level of the coating liquid in an electrodeposition cistern, flow rate, level difference from a sub tank, concentration of solid content in a reclaim liquid process, pressure difference through a filter, flushing pressure and state of a nozzle in a washing process, amount of permeation of a UF module, frequency of reverse flushing, amount of emulsion supply, amount of paste supply, throughput number of the coating equipment, and temperature of a drying furnace.

* * * * *